United States Patent
Chen et al.

(10) Patent No.: US 7,365,522 B2
(45) Date of Patent: Apr. 29, 2008

(54) MULTIPLE OUTPUT STAGE CONVERTER AND OPERATING METHOD THEREOF

(75) Inventors: Hsu-Min Chen, Hsinchu (TW); Yi-Chung Chou, Taipei (TW)

(73) Assignee: ITE Tech. Inc., Hsinchu (TW)

( * ) Notice: Subject to any disclaimer, the term of this patent is extended or adjusted under 35 U.S.C. 154(b) by 49 days.

(21) Appl. No.: 11/532,909

(22) Filed: Sep. 19, 2006

(65) Prior Publication Data
US 2008/0036437 A1    Feb. 14, 2008

(30) Foreign Application Priority Data
Aug. 10, 2006   (TW)   ................. 95129333 A

(51) Int. Cl.
*G05F 1/577*   (2006.01)
(52) U.S. Cl. ............... 323/267; 323/222; 323/284
(58) Field of Classification Search ............... 323/222, 323/225, 267, 271, 284, 285, 351
See application file for complete search history.

(56) References Cited

U.S. PATENT DOCUMENTS

| | | | |
|---|---|---|---|
| 6,222,352 B1 * | 4/2001 | Lenk | ............. 323/267 |
| 6,504,423 B2 * | 1/2003 | Riggio et al. | ............. 323/351 |
| 6,853,171 B2 | 2/2005 | May | |
| 7,119,521 B2 * | 10/2006 | Ishii et al. | ............. 323/222 |
| 7,253,592 B2 * | 8/2007 | Leyk et al. | ............. 323/222 |

* cited by examiner

*Primary Examiner*—J. Han
(74) *Attorney, Agent, or Firm*—Jianq Chyun IP Office

(57) ABSTRACT

A multiple output stage converter (MOSC) and an operating method thereof are provided. The MOSC includes a first transistor, a second transistor, a third transistor, and a logic control module. A terminal of the first transistor, a terminal of the second transistor, and a terminal of the third transistor are coupled to a power source via an inductor. Another terminal of the first transistor is coupled to a first output terminal. Another terminal of the second transistor is coupled to a second output terminal. Another terminal of the third transistor is coupled to a ground voltage. The logic control module is used to control the on/off state of the second transistor. The well of the second transistor is floating when the first transistor or the third transistor is on. The well of the second transistor is floated or coupled to the second output terminal when the second transistor is on.

31 Claims, 5 Drawing Sheets

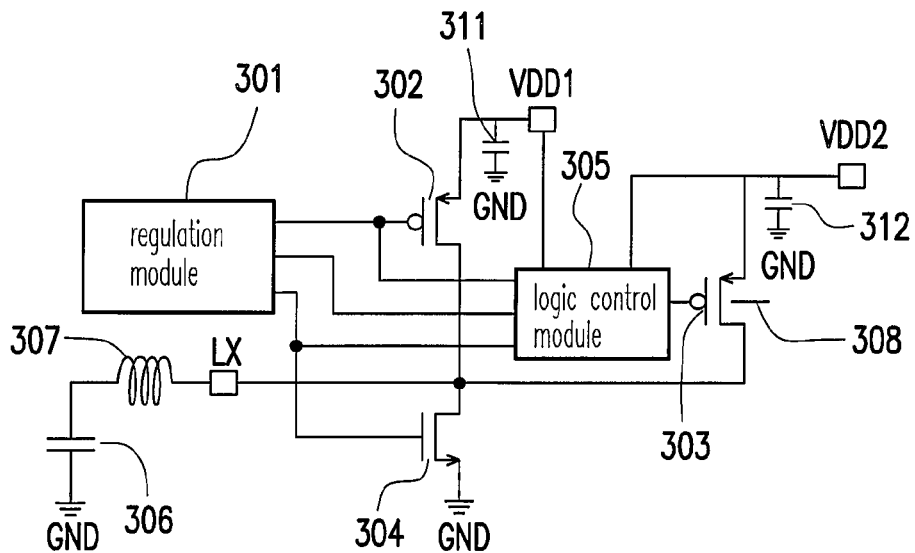

FIG. 3

| turn on the first transistor, turn off the second transistor and the third transistor, couple the gate of the second transistor to the first output terminal or the second output terminal, and float the well of the second transistor | 401 |

↓

| turn on the second transistor, turn off the first transistor and the third transistor, and float the well of the second transistor | 402 |

↓

| turn on the third transistor, turn off the first transistor and the second transistor, couple the gate of the second transistor to the first output terminal or the second output terminal, and float the well of the second transistor | 403 |

FIG. 4

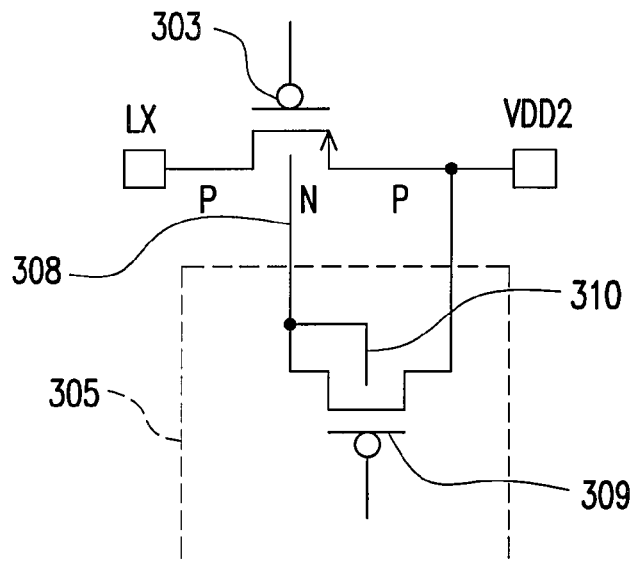

FIG. 8

| turn on the first transistor, turn off the second, the third and the fourth transistor, so as to float the well of the second transistor and couple the gate of the second transistor to the first output terminal or the second output terminal | ← 901 |

| turn on the second and the fourth transistor, so as to couple the well of the second transistor to the second output terminal, and turn off the first transistor and the third transistor | ← 902 |

| turn on the third transistor, turn off the first, the second and the fourth transistor, so that the well of the second transistor is floating, and the gate of the second transistor is coupled to the first output terminal or the second output terminal | ← 903 |

FIG. 9

MULTIPLE OUTPUT STAGE CONVERTER AND OPERATING METHOD THEREOF

CROSS-REFERENCE TO RELATED APPLICATION

This application claims the priority benefit of Taiwan application serial no. 95129333, filed Aug. 10, 2006. All disclosure of the Taiwan application is incorporated herein by reference.

BACKGROUND OF THE INVENTION

1. Field of the Invention

The present invention relates to an MOSC and an operating method thereof. More particularly, the present invention relates to an MOSC that has a low power loss and having a comparatively simple logic control module and a simple operating method.

2. Description of Related Art

Along with the rapid development in the diversification of function of electronic products, the electronic product manufacturers generally adopt integrated circuits (ICs) of different specifications in the products of their own, so as to meet various requirements. However, as the operating voltage of the ICs adopted is different, the electronic product manufacturers adopt an MOSC in the electronic products to convert a fixed voltage into various voltage levels for the ICs, such as the circuits in FIGS. 1 and 2, having different operating voltages.

FIG. 1 is a conventional MOSC. Referring to FIG. 1, the conventional MOSC includes a logic controller 101, PMOS transistors 102 and 103, an NMOS transistor 104, a cell 105, and an inductor 106. When the transistor 104 is on and the transistors 102, 103 are off under the control of the logic controller 101, the electric power stored in the cell 105 is discharged to a ground voltage GND via the inductor 106 and the transistor 104, thereby some energy is stored in the inductor 106. Then, the transistors 103, 104 are off and the transistor 102 is on under the control of the logic controller 101, such that the electric power stored in the cell 105 and the energy stored in the inductor 106 are transmitted to an output terminal VDD1 of the MOSC via the transistor 102, so as to provide a voltage to the circuit coupled to the output terminal VDD1.

After that, the transistors 102, 103 are off and the transistor 104 is on under the control of the logic controller 101, such that the electric power stored in the cell 105 is discharged to the ground voltage GND via the inductor 106 and the transistor 104, thereby some energy is stored in the inductor 106. Then, the transistors 102, 104 are off and the transistor 103 is on under the control of the logic controller 101, such that the electric power stored in the cell 105 and the energy stored in the inductor 106 are transmitted to an output terminal VDD2 of the MOSC via the transistor 103, so as to provide a voltage to the circuit coupled to the output terminal VDD2.

The energy stored in the inductor 106 varies with the on-time of the transistor 104, and thus controlling the on-time of the transistor 104 functions as controlling the amount of energy stored in the inductor 106. Therefore, the magnitude of the voltage at the output terminals VDD1, VDD2 can be controlled by controlling the amount of energy stored in the inductor 106.

However, when the output terminal VDD1 is used to output a voltage higher than the voltage output by the terminal VDD2, the design of coupling the well 107 of the transistor 103 to the output terminal VDD1 in the circuit as shown in FIG. 1 is improper, because this scheme may cause a body effect of the transistor 103, leading to the rising of the on-resistance of the transistor 103, and thus the transistor 103 has a higher power consumption and requires more time to be turned on. On the contrary, when the output terminal VDD2 is used to output a voltage higher than the voltage output by the output terminal VDD1, the transistor 102 may has the same situation.

FIG. 2 is a conventional MOSC disclosed in U.S. Pat. No. 6,853,171B2. Referring to FIG. 2, the circuit includes a regulation module 201, PMOS transistors 202 and 203, an NMOS transistor 204, a logic control module 205, a cell 206, an inductor 207, and capacitors 208 and 209. The output terminal VDD1 as shown in FIG. 2 is used to output a voltage higher than the voltage output by the output terminal VDD2.

The difference between the circuit of FIG. 2 and that in FIG. 1 is described as follows. The on and off of the transistors 202, 203, 204 in FIG. 2 are controlled according to a signal output by the regulation module 201, and the logic control module 205 in FIG. 2 controls the voltage of the gate and the well of the transistor 203 in the following manner. When the transistor 202 is on and the transistors 203, 204 are off, the gate and the well of the transistor 203 are coupled to the output terminal VDD1. When a voltage is output via the output terminal VDD2, a low logic signal (i.e., low level) is output to the gate of the transistor 203 to turn on the transistor 203 and couple the well of the transistor 203 to the output terminal VDD2. When the transistor 204 is on and the transistors 202, 203 are off, the gate and the well of the transistor 203 are coupled to the output terminal VDD2.

However, though in the above control scheme of the logic control module 205, the transistor 203 can act correctly when both are being turned on and turned off by controlling the voltage of the well and avoid the leakage current of the transistor 203, the complexity in controlling the logic control module 205 increases, which increases the difficulty in designing the logic control module 205. In addition, along with the increasing of complexity in control, the logic control module 205 must have a complicated circuit, such that the product is cost increased, and the profit margin of the manufacturer and the competitive capability of the product are reduced.

SUMMARY OF THE INVENTION

The present invention is directed to a MOSC, which can operate correctly and has a comparatively less complicated logic control module.

The present invention is also directed to a MOSC, which has an advantage of low power loss.

The present invention is further directed to a MOSC, which can reduce the product cost.

The present invention is still directed to a MOSC, which has no leakage current path.

The present invention is also directed to a method of operating an MOSC, such that the MOSC can act correctly and has a comparatively less complicated logic control module.

The present invention is further directed to a method of operating the MOSC, such that the MOSC has the advantage of low power loss.

The present invention is still directed to a method of operating the MOSC, which can reduce the product cost.

The present invention is also directed to a method of operating the MOSC, such that the MOSC has no leakage current path.

In accordance with the above and other objectives, the present invention provides an MOSC, which comprises a first transistor, a second transistor, a third transistor, and a logic control module. The first transistor has a source/drain coupled to a first output terminal, another source/drain coupled to an inductor, and a gate coupled to a first control signal, so as to determine the on/off status of the first transistor according to the first control signal. The second transistor has a source/drain coupled to a second output terminal, another source/drain coupled to an inductor, and the on/off status of the second transistor is determined according to a second control signal, wherein the well of the second transistor is floating.

The third transistor has a source/drain coupled to another source/drain of the first transistor, another source/drain coupled to a ground voltage, and a gate coupled to a third control signal, so as to determine the on/off status of the third transistor according to the third control signal. The logic control module is coupled to the gate of the second transistor, wherein a voltage is output to the gate of the second transistor when the first control signal or the third control signal is enabled, and the second control signal is output to the gate of the second transistor when the second control signal is enabled.

In accordance with the above or other objectives, the present invention provides an MOSC, which comprises a first transistor, a second transistor, a third transistor, and a logic control module. The first transistor has a source/drain coupled to a first output terminal, another source/drain coupled to an inductor, and a gate coupled to a first control signal which determines the on/off of the first transistor. The second transistor has a source/drain coupled to a second output terminal, another source/drain coupled to an inductor, and the on/off status of the second transistor is determined according to a second control signal.

Third transistor has a source/drain coupled to another source/drain of the first transistor, another source/drain coupled to a ground voltage, and a gate coupled to a third control signal, so as to determine the on/off status of the third transistor according to the third control signal. The logic control module is coupled to the gate and the well of the second transistor. When the first control signal or the third control signal is enabled, a voltage is output to the gate of the second transistor and the well of the second transistor is floating. When the second control signal is enabled, the second control signal is output to the gate of the second transistor and the well of the second transistor is coupled to the second output terminal.

Based on the above or other objectives, the present invention provides a method of operating an MOSC, wherein the MOSC comprises a first transistor, a second transistor, a third transistor, and an inductor. A source/drain of the first transistor, a source/drain of the second transistor, and a source/drain of the third transistor are coupled to a power source via an inductor. Another source/drain of the first transistor is coupled to a first output terminal. Another source/drain of the second transistor is coupled to a second output terminal. Another source/drain of the third transistor is coupled to a ground voltage. Moreover, the first output terminal is used to output a voltage higher than the voltage output by the second output terminal.

The operating method comprises the following steps. First, the first transistor is turned on, the second transistor and the third transistor are turned off, the gate of the second transistor is coupled to the first output terminal or the second output terminal, and the well of the second transistor is floating. Next, the second transistor is turned on, the first transistor and the third transistor are turned off, and the well of the second transistor is floated. Next, the third transistor is turned on, the first transistor and the second transistor are turned off, the gate of the second transistor is coupled to the first output terminal or the second output terminal, and the well of the second transistor is floated.

In accordance with the above or other objectives, the present invention provides a method of operating the MOSC, wherein the MOSC comprises a first transistor, a second transistor, a third transistor, a fourth transistor, and an inductor. A source/drain of the first transistor, a source/drain of the second transistor, and a source/drain of the third transistor are coupled to a power source via an inductor. Another source/drain of the first transistor is coupled to a first output terminal. Another source/drain of the second transistor is coupled to a second output terminal and a source/drain of the fourth transistor. The well of the second transistor is coupled to another source/drain and the well of the fourth transistor. Another source/drain of the third transistor is coupled to a ground voltage. Moreover, the first output terminal is used to output a voltage higher than the voltage output by the second output terminal.

The operating method comprises the following steps. First, the first transistor is turned on, and the second transistor, the third transistor, and the fourth transistor are turned off, so that the well of the second transistor is floated and the gate of the second transistor is coupled to the first output terminal or the second output terminal. The second transistor and the fourth transistor are turned on so that the well of the second transistor is coupled to the second output terminal and the first transistor and the third transistor are turned off. The third transistor is turned on, the first transistor, the second transistor, and the fourth transistor are turned off, so that the well of the second transistor is floated and the gate of the second transistor is coupled to the first output terminal or the second output terminal.

According to in an embodiment of the present invention, another source/drain of the above first transistor is further coupled to a power source via an inductor and the inductor is used to store the energy provided by the power source.

According to an embodiment of the present invention, a regulation module is further provided. The regulation module is coupled to the gate of the first transistor, the gate of the third transistor, and the logic control module, for providing the first control signal, the second control signal, and the third control signal.

According to an embodiment of the present invention, the aforementioned logic control module comprises a fourth transistor. The fourth transistor has a source/drain coupled to the second output terminal, another source/drain coupled to the well of the second transistor, and the on-time of the fourth transistor is the same as that of the second transistor.

According to an embodiment of the present invention, the aforementioned first, second and fourth transistors are PMOS transistors, and the third transistor is an NMOS transistor.

According to an embodiment of the present invention, a first capacitor is further provided. The first capacitor is coupled between the first output terminal and the ground voltage. The aforementioned logic control module is further coupled to the first output terminal, and the voltage output by the logic control module is the voltage of the first output terminal.

According to an embodiment of the present invention, a second capacitor is further provided. The second capacitor is coupled between the second output terminal and the ground voltage. The aforementioned logic control module is further coupled to the second output terminal, and the voltage output by the logic control module is the voltage of the second output terminal.

In the present invention, the well of the second transistor for outputting a low voltage is floated when the first transistor or the third transistor is on, and the well of the second transistor is floated or coupled to the second output terminal when the second transistor is on, so as to solve problems such as the body effect and the power consumption caused by the increasing of the on-resistance described in the conventional art. Moreover, the present invention has no leakage current path, and can operate correctly without any highly complicated logic control module.

In order to make the aforementioned and other objectives, features and advantages of the present invention comprehensible, preferred embodiments accompanied with figures are described in detail below.

BRIEF DESCRIPTION OF THE DRAWINGS

FIG. 3 is an MOSC according to an embodiment of the present invention.

FIG. 4 is a flow chart of the operating method of the MOSC of FIG. 3.

FIG. 8 is a schematic view of the coupling manner of the transistor in the logic control module.

FIG. 9 is a flow chart of the method of operating the MOSC of FIG. 7.

FIG. 10 is a schematic view of the on-state of the transistors 303, 309 when both being turned on.

DESCRIPTION OF EMBODIMENTS

Figure 1:
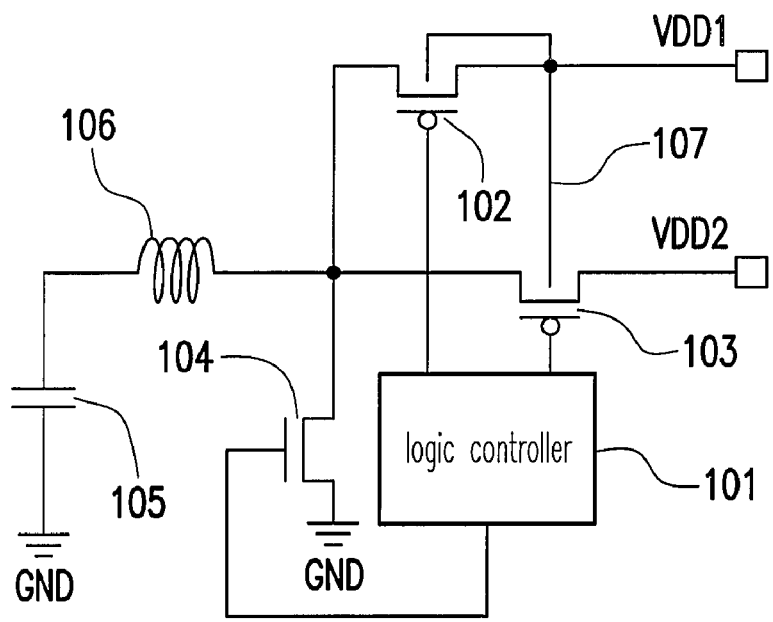
FIG. 1 is a conventional MOSC.

FIG. 3 is an MOSC according to an embodiment of the present invention. FIG. 4 is a flow chart of the method of operating the MOSC of FIG. 3. Referring to FIGS. 3 and 4 according to the requirements of illustration, the MOSC of FIG. 3 includes a regulation module 301, transistors 302, 303, 304, a logic control module 305, a cell 306, an inductor 307, and capacitors 311, 312. The transistors 302, 303 are PMOS transistors, the transistor 304 is an NMOS transistor, and the well 308 of the transistor 303 is not coupled to any object, i.e., is floating. In addition, the output terminal VDD1 of the circuit as shown in FIG. 3 is assumed to be used to output a voltage higher than the voltage output by the output terminal VDD2.

The regulation module 301 is used to provide a first control signal, a second control signal, and a third control signal respectively to the gate of the transistor 302, the logic control module 305, and the gate of the transistor 304, such that the on/off status of the transistor 302 is determined according to the first control signal, the on/off status of the transistor 304 is determined according to the third control signal, and the on/off status of the transistor 303 is determined by the logic control module 305 according to the second control signal.

The logic control module 305 controls the gate voltage of the transistor 303 in the following manner. When the first control signal is enabled to turn on the transistor 302 and turn off the transistors 303, 304, the voltage of the first output terminal VDD1 or the voltage of the second output terminal VDD2 is output to the gate of the transistor 303 (Step 401 in FIG. 4). When the second control signal is enabled to turn off the transistors 302, 304, the second control signal is output to the gate of the transistor 303, so as to turn on the transistor 303 (Step 402 in FIG. 4). When the third control signal is enabled to turn on the transistor 304 and turn off the transistors 302, 303, the voltage of the first output terminal VDD1 or the voltage of the second output terminal VDD2 is output to the gate of the transistor 303 (Step 403 in FIG. 4).

Figure 5:
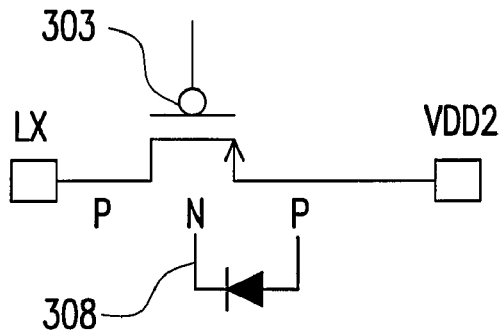
FIG. 5 is a schematic view of the on-state of the transistor 303 of FIG. 3.

However, the well 308 of the transistor 303 remains floated regardless the transistor 303 is on or off. Therefore, when the transistor 303 is turned on and the transistors 302, 304 are turned off, the transistor 303 conducts the voltage of the second output terminal VDD2 to the well 308 of the transistor 303 due to the parasitic diode formed by the PN junction of the transistor 303, as shown in FIG. 5. FIG. 5 is a schematic view of the on-state of the transistor 303 of FIG. 3. Referring to FIG. 5, the voltage of the well 308 of the transistor 303 rises to the voltage of the second output terminal VDD2, such that the source and the well 308 of the transistor 303 have the same voltage, thus avoiding the circumstance that the source voltage is lower than the voltage of the well 308 and also preventing the body effect of the transistor 303.

Figure 6:
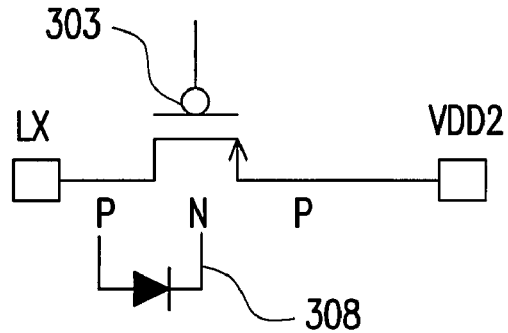
FIG. 6 is a schematic view of the off-state of the transistor 303 of FIG. 3.

Similarly, when the transistor 302 is on and the transistors 303, 304 are off, the transistor 303 conducts the voltage at the coupling portion LX of the inductor 307 and the transistor 304 to the well 308 of the transistor 303 due to the parasitic diode formed by the PN junction of the transistor 303, as shown in FIG. 6. FIG. 6 is a schematic view of the off-state of the transistor 303 of FIG. 3. Referring to FIG. 6, the voltage of the well 308 of the transistor 303 rises to the voltage at the coupling portion LX of the inductor 307 and the transistor 304, such that the voltage of the well 308 of the transistor 303 is higher than the voltage of the first output terminal VDD1, thus avoiding the leakage current of the transistor 303.

Figure 2:
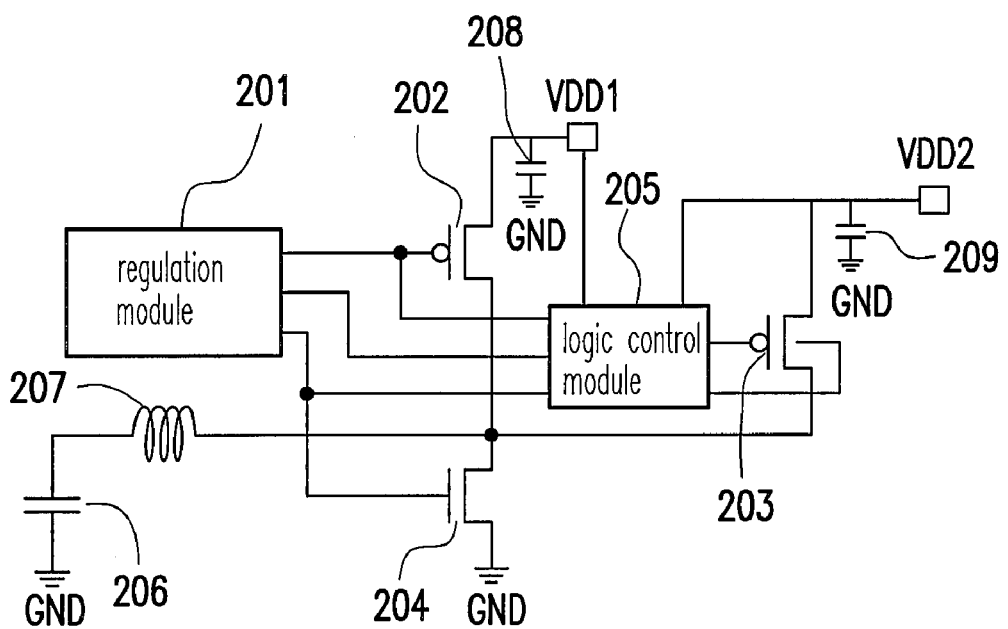
FIG. 2 is a conventional MOSC disclosed in U.S. Pat. No. 6,853,171B2.

According to the above description, the well 308 of the transistor 303 in the circuit of FIG. 3 is floated, such that the circuit of FIG. 3 not only has the same function as the circuit of FIG. 1, but also eliminates the disadvantage of body effect of the circuit of FIG. 1. Meanwhile, the circumstance of leakage current is avoided and the layout is simplified. Therefore, the circuit of FIG. 3 has various advantages. Comparing with the circuit of FIG. 2, the circuit of FIG. 3 is not required to control the magnitude of the voltage of the well 308 of the transistor 303 directing to the on-state of the transistor 303, thus simplifying the complexity of controlling the logic control module 305. Therefore, the manufacturers can omit the complicated circuit in the logic control module 305, thereby reducing the product cost, increasing the profit, and enhancing the competitive capability of the product.

Figure 7:
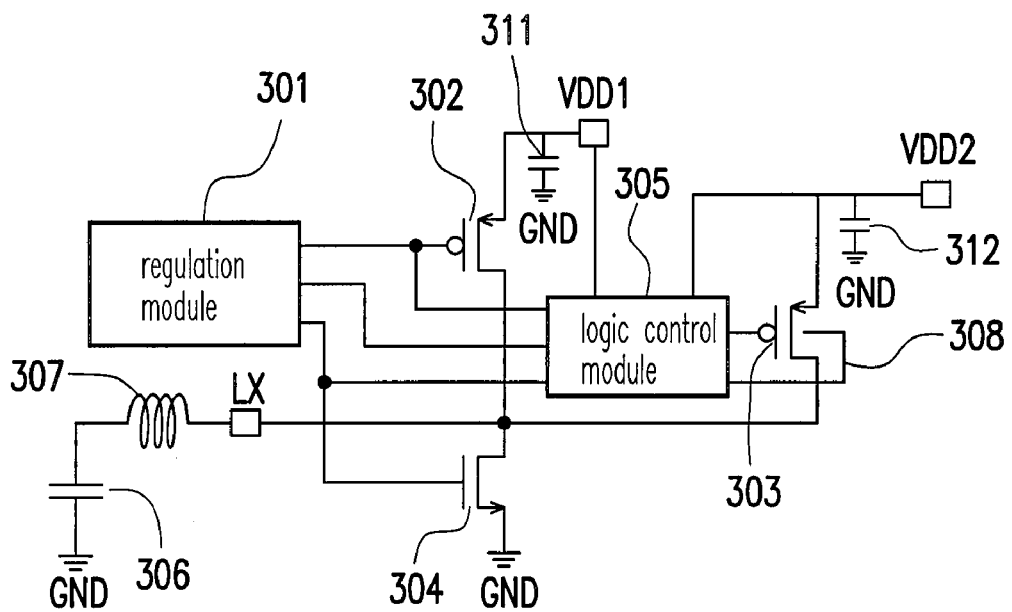
FIG. 7 is an MOSC according to another embodiment of the present invention.

According to the circuit of FIG. 3, in order to provide the transistor 303 in FIG. 3 with a fast conduction speed, users can employ the circuit of FIG. 7 and the operating manner thereof to control the voltage of the well 308 of the transistor 303.

FIG. 7 is an MOSC according to another embodiment of the present invention. Referring to FIGS. 3 and 7, the difference therebetween is described in the illustration. The well 308 of the transistor 303 in the circuit of FIG. 7 is coupled to the logic control module 305, such that the voltage of the well 308 of the transistor 303 is controlled by the logic control module 305.

However, since it is necessary to control the voltage of the well 308 of the transistor 303, one transistor 309 is added in the original logic control module 305, as shown in FIG. 8. FIG. 8 is a schematic view of the coupling manner of the transistor in the logic control module. Referring to FIG. 8, the transistor 309 is also an MOS transistor. The drain and the source of the transistor 309 are respectively coupled to the second output terminal VDD2 and the well 308 of the transistor 303, and the well 310 of the transistor 309 is coupled to the well 308 of the transistor 303. In addition, directed to the newly-added transistor 309, under the control of the logic control module 305 installed with the transistor 309, the transistor 303 and the transistor 309 are turned on/off at the same time.

FIG. 9 is a flow chart of the method of operating the MOSC in FIG. 7. Refer to FIGS. 7 and 9 according to the requirements of illustration. Referring to FIG. 7, as the transistor 303 and the transistor 309 must be turned on/off at the same time under the control, the method of operating the original logic control module 305 can be alternatively achieved in the manner as follows. When the first control signal is enabled to turn on the transistor 302 and turn off the transistors 303, 304, 309, the well 308 of the transistor 303 is floating, and the voltage of the first output terminal VDD1 or the second output terminal VDD2 is output to the gate of the transistor 303 (Step 901 in FIG. 9).

When the second control signal is enabled to turn off the transistors 302, 304, the second control signal is output to the gate of the transistors 303, 309, so as to turn on the transistors 303, 309 and couple the well 308 of the transistor 303 to the second output terminal VDD2 (Step 902 in FIG. 9). When the third control signal is enabled to turn on the transistor 304 and turn off the transistors 302, 303, 309, the well 308 of the transistor 303 is floated, and the voltage of the first output terminal VDD1 or the second output terminal VDD2 is output to the gate of the transistor 303 (Step 903 in FIG. 9).

According to the above operating method of the logic control module 305, the simplest method to control the transistors 303 and 309 to be on/off simultaneously is coupling the gate of the transistor 309 to the gate of the transistor 303, such that the on/off of the transistor 309 is determined by the signal received by the gate thereof. In addition, users can adopt another manner as required.

Figure 10:
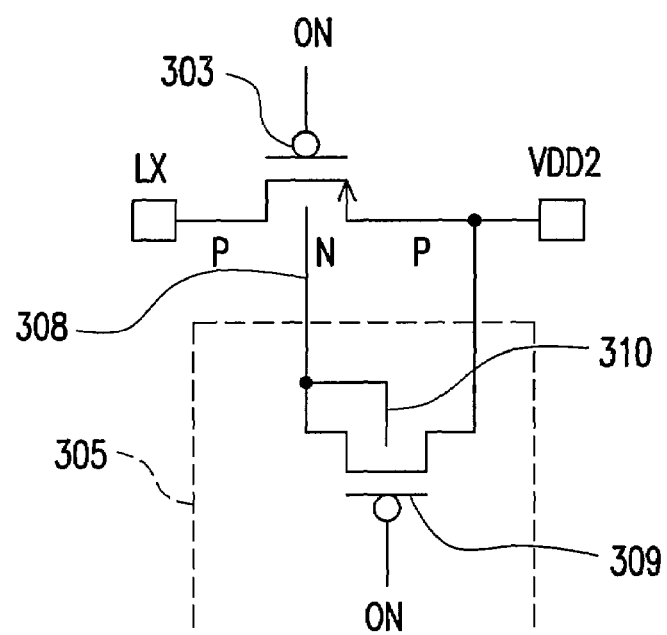
Figure 11:
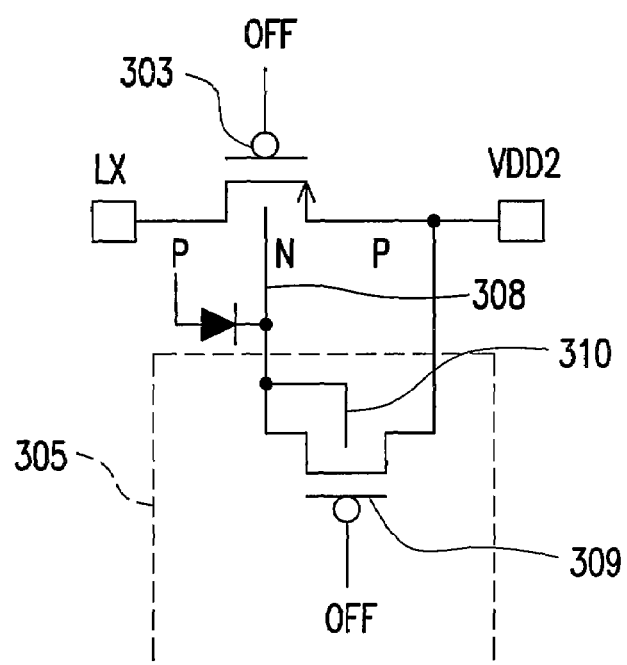
FIG. 11 is a schematic view of the off-state of the transistors 303, 309 when both being turned off.

When the transistors 303, 309 are turned on, the voltage of the well 308 of the transistor 303 quickly rises to the voltage level of the second output terminal VDD2, thus accelerating the conduction speed of the transistor 303, as shown in FIG. 10. FIG. 10 is a schematic view of the on-state of the transistors 303, 309 when both being turned on. When the transistors 303, 309 are turned off, the voltage of the well 308 of the transistor 303 also rises to the voltage level at the coupling portion LX of the inductor 307 and the transistor 304 due to the parasitic diode formed by the PN junction of the transistor 303, thus avoiding the circumstance of leakage current of the transistor 303, as shown in FIG. 11. FIG. 11 is a schematic view of the off-state of the transistors 303, 309 when both being turned off.

According to the above descriptions, the transistors in the circuit of FIG. 7 can operate correctly. Moreover, though one transistor 309 is added into the logic control module 305 in the circuit of FIG. 7, different from the logic control module 205 in FIG. 2, the logic control module 305 of FIG. 7 is not required to switch the voltage of the well of the transistor 203 between the voltage of the output terminals VDD1 and VDD2. Therefore, the logic control module 305 of FIG. 7 simplifies the control complexity, such that the manufacturers can omit the complicated circuit in the logic control module 305, thus reducing the product cost, raising the profit, and enhancing the competitive capability of the product.

Further, compared with the circuit of FIG. 1, the circuit of FIG. 7 eliminates the disadvantage of body effect of the circuit of FIG. 1 and avoids the circumstance of leakage current, thus preventing extra power consumption.

Though the above embodiments have provided possible implementation modes of the MOSC, those of ordinary skill in the art should understand that each manufacturer has a different design scheme on the MOSC. Therefore, those that can be used to float the well of the transistor for outputting a lower voltage, and selectively float the well or couple the well to the output terminal of the low voltage when the transistor is on, so as to simplify the control complexity of the logic control module and solve the problem of body effect are not departing the spirit of the present invention. It should be noted that, the cell 306 in the above embodiments can be substituted by another DC power source.

In view of the above, in the present invention, the well of the second transistor for outputting a low voltage is floated when the first transistor or the third transistor is on, and the well of the second transistor is also floating when the second transistor is turned on or coupled to the second output terminal, thereby solving the problems such as the body effect and the power consumption caused by the raise of the on-resistance existing in the conventional art. Additionally, the present invention has no leakage current path, and meanwhile can act correctly has a less complicated logic control module.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A multiple output stage converter (MOSC), comprising:
    a first transistor, having a source/drain coupled to a first output terminal, another source/drain coupled to an inductor, and a gate coupled to a first control signal, so as to determine an on/off status of the first transistor according to the first control signal;
    a second transistor, having a source/drain coupled to a second output terminal, another source/drain coupled to the inductor, and an on/off of the second transistor being determined according to a second control signal, wherein the well of the second transistor is floated;
    a third transistor, having a source/drain coupled to another source/drain of the first transistor, another source/drain thereof coupled to a ground voltage, and a gate coupled to a third control signal, so as to determine an on/off status of the third transistor according to the third control signal; and a logic control module, coupled to the gate of the second transistor, wherein a voltage is output to the gate of the second transistor when the first control signal or the third control signal is enabled, and the second control signal is output to the gate of the second transistor when the second control signal is enabled.

2. The MOSC as claimed in claim 1, wherein another source/drain of the first transistor is further coupled to a power source via the inductor, and the inductor is used to store the energy provided by the power source.

3. The MOSC as claimed in claim 2, wherein the power source is provided by a cell.

4. The MOSC as claimed in claim 1, further comprising a regulation module, wherein the regulation module is coupled to the gate of the first transistor, the gate of the third transistor, and the logic control module, so as to provide the first control signal, the second control signal, and the third control signal.

5. The MOSC as claimed in claim 1, wherein the first transistor and the second transistor are PMOS transistors, and the third transistor is an NMOS transistor.

6. The MOSC as claimed in claim 1, further comprising a first capacitor coupled between the first output terminal and the ground voltage.

7. The MOSC as claimed in claim 6, wherein the logic control module is further coupled to the first output terminal, and a voltage output by the logic control module is a voltage of the first output terminal.

8. The MOSC as claimed in claim 1, further comprising a second capacitor coupled between the second output terminal and the ground voltage.

9. The MOSC as claimed in claim 8, wherein the logic control module is further coupled to the second output terminal, and a voltage output by the logic control module is a voltage of the second output terminal.

10. An MOSC, comprising:
a first transistor, having a source/drain coupled to a first output terminal, another source/drain coupled to an inductor, and a gate coupled to a first control signal, so as to determine an on/off status of the first transistor according to the first control signal;
a second transistor, having a source/drain coupled to a second output terminal, another source/drain coupled to the inductor, the on/off of the second transistor being determined according to a second control signal,
a third transistor, having a source/drain coupled to another source/drain of the first transistor, another source/drain coupled to a ground voltage, and a gate coupled to a third control signal, so as to determine an on/off status of the third transistor according to the third control signal; and
a logic control module, coupled to the gate and the well of the second transistor, wherein a voltage is output to the gate of the second transistor and the well of the second transistor is floated when the first control signal or the third control signal is enabled, and the second control signal is output to the gate of the second transistor and the well of the second transistor is coupled to the second output terminal when the second control signal is enabled.

11. The MOSC as claimed in claim 10, wherein the logic control module comprises a fourth transistor having a source/drain coupled to the second output terminal, another source/drain coupled to the well of the second transistor, and the on-time of the fourth transistor is equal to that of the second transistor.

12. The MOSC as claimed in claim 11, wherein the first transistor, the second transistor, and the fourth transistor are PMOS transistors, and the third transistor is an NMOS transistor.

13. The MOSC as claimed in claim 10, wherein another source/drain of the first transistor is further coupled to a power source via the inductor, and the inductor is used to store an energy provided by the power source.

14. The MOSC as claimed in claim 13, wherein the power source is provided by a cell.

15. The MOSC as claimed in claim 10, further comprising a regulation module, wherein the regulation module is coupled to the gate of the first transistor, the gate of the third transistor, and the logic control module, so as to provide the first control signal, the second control signal, and the third control signal.

16. The MOSC as claimed in claim 10, further comprising a first capacitor coupled between the first output terminal and the ground voltage.

17. The MOSC as claimed in claim 16, wherein the logic control module is further coupled to the first output terminal, and a voltage output by the logic control module is a voltage of the first output terminal.

18. The MOSC as claimed in claim 10, further comprising a second capacitor coupled between the second output terminal and the ground voltage.

19. The MOSC as claimed in claim 18, wherein the logic control module is further coupled to the second output terminal, and the voltage output by the logic control module is the voltage of the second output terminal.

20. A method of operating an MOSC, the MOSC comprising a first transistor, a second transistor, a third transistor, and an inductor, wherein a source/drain of the first transistor, a source/drain of the second transistor and a source/drain of the third transistor are coupled to a power source via the inductor, another source/drain of the first transistor is coupled to a first output terminal, another source/drain of the second transistor is coupled to a second output terminal, another source/drain of the third transistor is coupled to a ground voltage; and the first output terminal is used to output a voltage higher than a voltage output by the second output terminal, the operating method comprising:
turning on the first transistor, turning off the second transistor and the third transistor, coupling a gate of the second transistor to the first output terminal or the second output terminal, and floating a well of the second transistor;
turning on the second transistor, turning off the first transistor and the third transistor, and floating the well of the second transistor; and
turning on the third transistor, turning off the first transistor and the second transistor, coupling the gate of the second transistor to the first output terminal or the second output terminal, and floating the well of the second transistor.

21. The method of operating the MOSC as claimed in claim 20, wherein the power source is provided by a cell.

22. The method of operating the MOSC as claimed in claim 20, wherein the MOSC further comprises:
a regulation module, coupled to a gate of the first transistor and a gate of the third transistor, for providing a first control signal, a second control signal, and a third control signal, wherein a on/off status of the first transistor and the third transistor is respectively determined according to the first control signal and the third control signal; and a logic control module, coupled to the regulation module and the gate of the second transistor, for receiving the second control signal, wherein the gate of the second transistor is coupled to the first output terminal or the second output terminal when the first control signal or the third control signal is enabled, and the second control signal is output to the gate of the second transistor when the second control signal is enabled, so as to determine an on/off status of the second transistor.

23. The method of operating the MOSC as claimed in claim 20, wherein the first transistor and the second transistor are PMOS transistors, and the third transistor is an NMOS transistor.

24. The method of operating the MOSC as claimed in claim 20, wherein the MOSC further comprises a first capacitor coupled between the first output terminal and the ground voltage.

25. The method of operating the MOSC as claimed in claim 20, wherein the MOSC further comprises a second capacitor coupled between the second output terminal and the ground voltage.

26. A method of operating an MOSC, the MOSC comprising a first transistor, a second transistor, a third transistor, a fourth transistor, and an inductor, wherein a source/drain of the first transistor, a source/drain of the second transistor, and a source/drain of the third transistor are coupled to a power source via the inductor; another source/drain of the first transistor is coupled to a first output terminal, another source/drain of the second transistor is coupled to a second output terminal and a source/drain of the fourth transistor, the well of the second transistor is coupled to another source/drain and the well of the fourth transistor, another source/drain of the third transistor is coupled to a ground voltage; and the first output terminal is used to output a voltage higher than the voltage output by the second output terminal, the operating method comprising:

turning on the first transistor, turning off the second transistor, the third transistor, and the fourth transistor, so that the well of the second transistor is floated and the gate of the second transistor is coupled to the first output terminal or the second output terminal;

turning on the second transistor and the fourth transistor, so that a well of the second transistor is coupled to the second output terminal, and turning off the first transistor and the third transistor; and turning on the third transistor, turning off the first transistor, the second transistor, and the fourth transistor, so that the well of the second transistor is floated and the gate of the second transistor is coupled to the first output terminal or the second output terminal.

27. The method of operating the MOSC as claimed in claim 26, wherein the power source is provided by a cell.

28. The method of operating the MOSC as claimed in claim 26, wherein the MOSC further comprises:

a regulation module, coupled to a gate of the first transistor and a gate of the third transistor, for providing a first control signal, a second control signal, and a third control signal, wherein an on/off status of the first transistor and the third transistor is respectively determined according to the first control signal and the third control signal; and a logic control module, coupled to the gate of the second transistor, the well of the second transistor, and the regulation module, for receiving the second control signal, wherein the gate of the second transistor is coupled to a first output terminal or a second output terminal when the first control signal or the third control signal is enabled, and the second control signal is coupled to the gate of the second transistor when the second control signal is enabled, so as to determine an on/off status of the second transistor, wherein the fourth transistor is disposed in the logic control module, and an on/off status of the fourth transistor is also determined according to the second control signal.

29. The method of operating the MOSC as claimed in claim 26, wherein the first transistor, the second transistor, and the fourth transistor are PMOS transistors, and the third transistor is an NMOS transistor.

30. The method of operating the MOSC as claimed in claim 26, wherein the MOSC further comprises a first capacitor coupled between the first output terminal and the ground voltage.

31. The method of operating the MOSC as claimed in claim 26, wherein the MOSC further comprises a second capacitor coupled between the second output terminal and the ground voltage.

* * * * *